UNITED STATES PATENT OFFICE.

THOMAS TWYNAM, OF LONDON, ENGLAND.

PROCESS OF PURIFYING IRON.

SPECIFICATION forming part of Letters Patent No. 416,814, dated December 10, 1889.

Application filed March 5, 1889. Serial No. 301,918. (No specimens.) Patented in England February 6, 1886, No. 1,796.

*To all whom it may concern:*

Be it known that I, THOMAS TWYNAM, a subject of the Queen of Great Britain, residing at 7 Marlboro Crescent, Bedford Park, London, England, have invented certain new and useful Improvements in Processes of Purifying Iron, (for which I have received Letters Patent in Great Britain under date February 6, 1886, No. 1,796,) of which the following is a specification.

My invention has for its object to improve pig-iron for use in the manufacture of steel by removing therefrom the metalloids which it is desired to eliminate, and simultaneously and as incidental to such purification of the pig-iron to improve or enrich in phosphorus the basic slag, which is thereby increased in value as an agricultural fertilizing agent.

I effect the purification of pig-iron and simultaneously the purification or enrichment of the ferruginous phosphatic slag obtained in the Thomas-Gilchrist or other process of steel manufacture by causing the metalloids contained in melted pig-iron to act upon and reduce the metallic oxides contained in the phosphatic slag, thus oxidizing and transferring from the metal to the slag the metalloid impurities contained in the pig-iron, and at the same time removing the metallic oxides from the slag. When a phosphoric pig-iron low in silicon is employed, the basic slag, molten or otherwise, is run or thrown into the melted phosphoric pig-iron on the hearth of a Siemens or other basic-lined furnace or vessel; or the operation may be reversed, the pig-iron being run in upon the slag contained in any suitable basic or neutrally lined furnace or vessel. The silicon and more or less of the carbon and phosphorus contained in the pig-iron are oxidized at the expense of the metallic oxides contained in the added basic slag, the resulting slag containing far less metallic oxides than the added slag, and being also richer in phosphoric acid. The pig-iron after being thus acted upon is low in silicon and very suitable for use in the basic process. If there be any considerable amount of silicon in the pig-iron treated or if a rich silicious pig be purposely used, there is considerable danger when working, as above described, of reducing some of the phosphoric acid in the added basic slag simultaneously with the metallic oxides. In this case I prefer to proceed as follows: The basic slag is added to the silicious pig-iron (or vice versa) in such proportion that the silicon of the metal will reduce not only the metallic oxides, but also the phosphoric acid, contained in the slag. The resulting silicious slag is run off as useless and a fresh quantity of basic slag added or run in upon the now desiliconized phosphoric bath of metal, or the metal may be run into a furnace or vessel containing the molten slag. In either case the phosphorus and carbon left in the metal will react upon the metallic oxides, as above stated. The reaction between the phosphorus and carbon contained in pig metal is, however, not so energetic as that of silicon upon the metallic oxides contained in slags.

Instead of adding fresh basic slag to the desiliconized metal obtained by the above-described process, the desiliconized metal may be employed direct for steel-manufacture in the basic Bessemer or Siemens process, the absence of silicon being very advantageous to the wear of the basic lining, while the resulting slag, being, through the absence of silicon in it, higher in phosphoric acid, is also of more value for agricultural purposes.

If the pig metal treated be a silicious one, but not phosphatic, I treat it, as before described, in a basic or neutrally lined furnace or vessel with the said basic slag. Upon the removal of the silicon and more or less of the carbon a practically pure carbide of iron is left, which is well suited for some kinds of castings and for other purposes. In this case such a proportion of the basic slag should be added to the silicious metal that the resulting slag should at no time contain more than twenty to twenty-five per cent. of silica, as, if more than this quantity be present, phosphorus will be introduced into the metal, owing to the reduction of the phosphoric acid.

When removing silicon by the above process, I use a furnace or vessel having either a basic or a neutral lining. If the latter be employed, it may advantageously be made of chrome iron ore made coherent by the process described in my United States Specification No. 371,233.

What I claim is—

The herein-described process of purifying pig-iron containing phosphorus and silicon and simultaneously producing a slag rich in phosphorus and suitable for use as a fertilizer, consisting in first mixing the iron to be purified, in a molten state, with a ferruginous phosphatic slag to desiliconize the iron, then separating the resulting silicious slag, and then adding to the desiliconized phosphoric bath of metal another charge of basic slag during the elimination of the phosphorus, substantially as set forth.

In testimony whereof I have hereunto set my hand in the presence of two subscribing witnesses.

THOMAS TWYNAM.

Witnesses:
PHILIP M. JUSTICE,
ALLEN P. JONES.